US008843406B2

(12) United States Patent
Aven et al.

(10) Patent No.: US 8,843,406 B2
(45) Date of Patent: Sep. 23, 2014

(54) USING PRODUCT AND SOCIAL NETWORK DATA TO IMPROVE ONLINE ADVERTISING

(75) Inventors: Brandy Lee Aven, Half Moon Bay, CA (US); David Anthony Burgess, Menlo Park, CA (US); Jonathan Frank Haynes, Kenilworth, IL (US); James Raymond Merino, Cupertino, CA (US); Paul Cameron Moore, Redwood City, CA (US)

(73) Assignee: Yahoo! Inc., Sunnyvale, CA (US)

( * ) Notice: Subject to any disclaimer, the term of this patent is extended or adjusted under 35 U.S.C. 154(b) by 696 days.

(21) Appl. No.: 11/965,509

(22) Filed: Dec. 27, 2007

(65) Prior Publication Data

US 2009/0171748 A1    Jul. 2, 2009

(51) Int. Cl.
 *G06Q 40/00* (2012.01)
 *G06Q 50/00* (2012.01)
 *G06Q 30/02* (2012.01)

(52) U.S. Cl.
 CPC .............. *G06Q 30/02* (2013.01); *G06Q 50/01* (2013.01); *G06Q 30/0256* (2013.01)
 USPC ......................................... 705/35; 705/36 R

(58) Field of Classification Search
 USPC .................................................... 705/14, 35
 See application file for complete search history.

(56) References Cited

U.S. PATENT DOCUMENTS

| 6,049,778 | A * | 4/2000 | Walker et al. ............... 705/14.14 |
| 2001/0049623 | A1 | 12/2001 | Aggarwal et al. |
| 2003/0100315 | A1 | 5/2003 | Renkin |
| 2005/0149397 | A1 | 7/2005 | Morgenstern et al. |
| 2007/0113241 | A1 | 5/2007 | Mai et al. |
| 2007/0121843 | A1 | 5/2007 | Atazky et al. |
| 2008/0033776 | A1 * | 2/2008 | Marchese ........................ 705/8 |
| 2008/0103907 | A1 * | 5/2008 | Maislos et al. .................. 705/14 |

FOREIGN PATENT DOCUMENTS

| JP | 2004-157835 | 6/2004 |
| TW | 200408258 | 5/2004 |
| TW | 200721030 | 1/2006 |
| WO | 2007/139857 | 12/2007 |

OTHER PUBLICATIONS

U.S. Appl. No. 11/670,013, filed Feb. 1, 2007.
U.S. Appl. No. 11/876,550, filed Oct. 22, 2007.
International Search Report in corresponding PCT Application No. PCT/2008/085022, mailed Jul. 2, 2009.
Written Opinion in corresponding PCT Application No. PCT/2008/085022, mailed Jul. 2, 2009.
TW patent application No. 97146875, Office Action mailed Nov. 9, 2012.

\* cited by examiner

*Primary Examiner* — Kirsten Apple
(74) *Attorney, Agent, or Firm* — Weaver Austin Villeneuve & Sampson LLP

(57) ABSTRACT

Methods and apparatus for improving word-of-mouth online advertising are provided. Construct a social network including multiple users based on the users' social network data and optionally further based on the users' demographical and/or other personal information. Categorize the users in the social network with respect to a type of product in terms of their propensity to adopt the type of product and to influence others in the social network in adopting the type of product. Determine appropriate content object(s) for each category of users, and send the content object(s) to each category of users via different channels at the appropriate time during the product's lifecycle.

26 Claims, 6 Drawing Sheets

USING PRODUCT AND SOCIAL NETWORK DATA TO IMPROVE ONLINE ADVERTISING

BACKGROUND OF THE INVENTION

The present invention relates to methods and computer program products for Internet advertising. More specifically, the present invention relates to methods and computer program products for improving the effectiveness of word-of-mouth advertising by tailoring the advertisement for a product to individual users based on the user's social network and the product's lifecycle.

Word-of-mouth marketing refers to the passing of product information in an informal, person-to-person manner, especially in the form of recommendations. The product information may be passed on via various channels, such as during face-to-face conversations, over telephones, via emails, text messages, online chats and/or posts, etc.

Word-of-mouth marketing can be very effective, and thus is highly valued by advertisers. Many people, both consumers and marketers, believe that this form of communication has valuable source credibility. Some researches have shown that individual consumers are more inclined to believe word-of-mouth marketing than other more formal forms of promotion methods because the receivers of the word-of-mouth information tend to believe that the senders, often families, friends, or colleagues of the receivers, are speaking honestly and are unlikely to have any ulterior motives.

There have been many successful examples of word-of-mouth marketing, among which Google's™ email service, Gmail™, is a particular noteworthy case. Instead of spending a lot of money marketing Gmail™, Google™ initially gave out Gmail™ accounts to a small number of so-called power users and enabled these power users to invite their acquaintances to join Gmail™. In fact, at one point, a person could not obtain a Gmail™ account unless invited by an existing Gmail™ user. This created scarcity and the limited supply helped increased the demand for Gmail™. People who aspired to be like the power users were bidding for Gmail™ invites on eBay®.

A key to successful word-of-mouth marketing is to identify those individual users who are likely to pass the product information among their families and friends, e.g., the power users in the Gmail™ case. That is, people who are willing to pass the product information along to the others are more valuable to word-of-mouth advertisers. Another important consideration is the timing of the advertisement, i.e., what is the best time period during a product's lifecycle that the advertisement should be sent to the individual users so as to maximize the effect of the word-of-mouth marketing.

SUMMARY OF THE INVENTION

Various embodiments of the present invention relate to systems and methods for conducting word-of-mouth marketing for a product among online users.

In one embodiment, methods and computer program products are provided for conducting online advertising. Users within a social network are categorized with respect to a product based on the users' social network data and other historical data. The categories indicate the users' position on the product's lifecycle and/or in relation to the other users within the same social network with respect to a type of product, such as whether a user is an early adopter, an influencer, a brand advocate, a majority purchaser, a late adopter, or a laggard. For each category of users on the product's lifecycle, a suitable advertisement is determined, and each advertisement is sent to the corresponding category of users at an appropriate time during the product's lifecycle. More generically, any type of communication, i.e., not just advertisement, may be tailored to individual users based on the user's category.

In another embodiment, methods and computer program products are provided for conducting online advertising. A user is categorized with respect to a product based on the user's social network data and other historical data, including, for example, the user's demographic information, past purchase behavior, etc. Based on the user's category with respect to the product's lifecycle, a suitable advertisement is determined for the user, and sent to the user at an appropriate time during the product's lifecycle.

These and other features, aspects, and advantages of the invention will be described in more detail below in the detailed description and in conjunction with the following figures.

BRIEF DESCRIPTION OF THE DRAWINGS

The present invention is illustrated by way of example, and not by way of limitation, in the figures of the accompanying drawings in which like reference numerals refer to similar elements, and in which.

DETAILED DESCRIPTION OF THE INVENTION

The present invention will now be described in detail with reference to specific embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail to avoid unnecessarily obscuring the present invention. In addition, while the invention will be described in conjunction with the particular embodiments, it will be understood that it is not intended to limit the invention to the described embodiments. To the contrary, it is intended to cover alternatives, modifications, and equivalents as may be included within the spirit and scope of the invention as defined by the appended claims.

Almost every person has a social network that includes his or her families, friends, colleagues, acquaintances, etc. Some people have large social networks, while other people interact with relatively few intimate and close family members and/or friends. Some people are very active within their social networks, maintaining close contacts with their acquaintances and often communicating with them via various channels, perhaps passing along various types of information. Other people are less sociable and only interact with their acquaintances on rare occasions.

Figure 1:
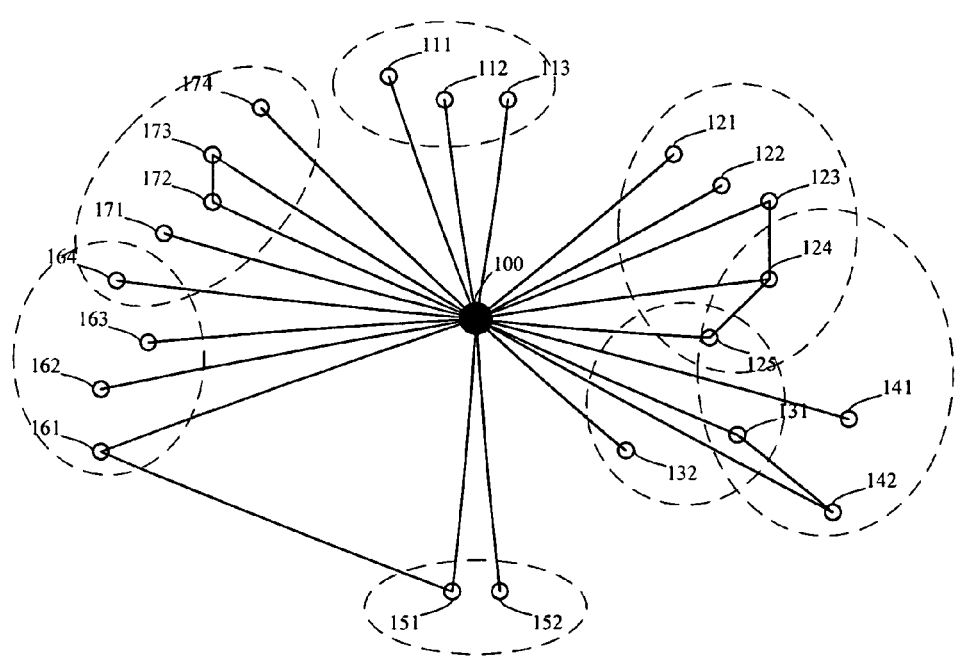
FIG. 1 illustrates a sample social network of an online user.

FIG. 1 illustrates a sample social network of an online user.

In this example, the user 100 has many contacts, together forming a social network including the user 100. The user's 100 contact information may be obtained from various online and/or offline resources. For example, contacts 121, 122, 123, 124, and 125 may be found in the contact list of the user's 100 personal email account. Contacts 125, 131, and 132 may be found in the contact list of the user's 100 work email account. Sometimes, a particular contact may be found in multiple resources associated with a user, such as contact 125 may be found in the contact list of both the user's 100 personal and work email accounts.

The user's 100 other activities may also provide information on the user's 100 contacts. For example, contacts 124, 125, 141, and 142 may belong to the same online discussion group as the user 100. The user 100 may exchange text messages with contacts 151 and 152 via SMS (short message service) or IM (instant messaging). Contacts 161, 162, 163, and 164 and the user 100 may all be members of a particular website, such as www.flickr.com™ or www.match.com®, and communicate with each other from time to time through a forum provided by the website. Contacts 111, 112, and 113 may be family members of the user 100 and share the same mobile telephone calling plan with the user 100. The user 100 communicates with each contact in his or her social network via appropriate channels, e.g., email, telephone, chat, text messaging, etc.

Some of the contacts of the user 100 may also communicate with each other directly. For example, contacts 172 and 173 may communicate directly with each other via one or more channels. In this case, in addition to being within the social network of the user 100, contact 173 is also in the social network of contact 172, and vice versa. Similarly, contacts 123 and 124 are in each other's social networks as well as both being contacts of the user 100.

Figure 2:
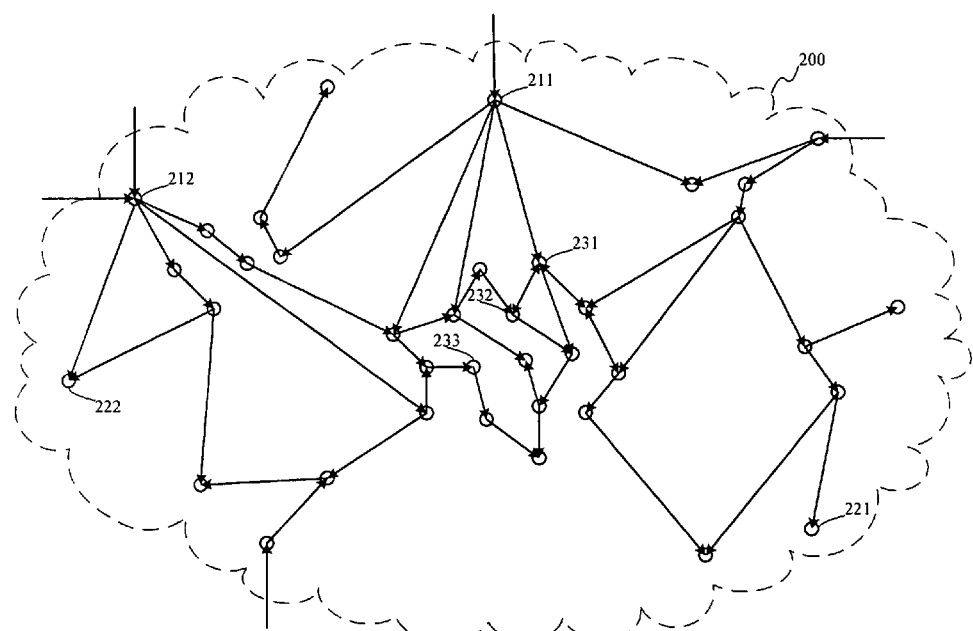
FIG. 2 illustrates a sample social network including multiple interconnected users.

Extending the social network of a single user into multiple users, a large social network may be constructed, which includes many individual users that communicate with each other via many different channels. FIG. 2 illustrates a sample social network 200 that includes multiple interconnected users. Each user in the social network 200 is represented by a small circle. A line connecting two users represents some form of contact or tie between the two users. The social network 200 only includes a small number of users for illustrative purpose. In reality, such a social network often includes thousands or hundreds of thousands of interconnected users.

A social network may be further refined to include only users who satisfy certain criteria. For example, a social network may be established to include only users from a particular geographical location, such as the United States. Another social network may be established to include only users having particular demographical characteristics, such as a network of users between the ages of 25 and 40, or a network of users working in a specific field. Any user demographical information, such as age, gender, ethnicity, profession, education, income, interest, marital status, etc., or any other user characteristics, such as geographical location, habits, family connections, etc., may be used as criteria when constructing a social network of users. And information relating to user characteristics may be obtained from various sources, such as from the information provided by the users to their registered accounts or from events collected while the users conduct various activities.

Figure 3:
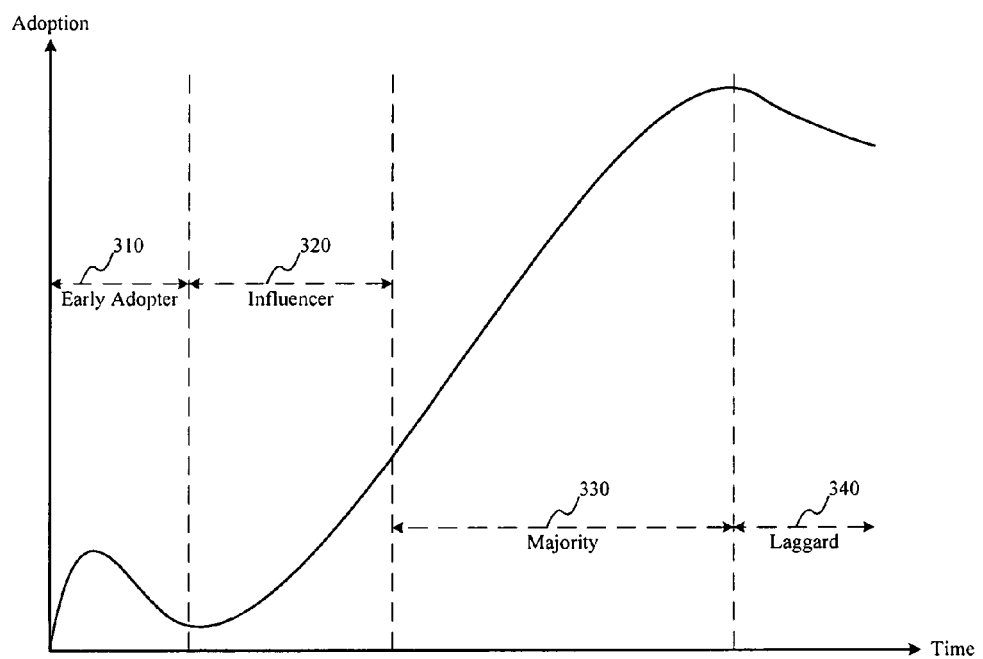
FIG. 3 illustrates a sample product lifecycle.

A product lifecycle refers to a marketing theory according to which a product or a brand follows a sequence of stages, including introduction to market, sales growth, sales maturity, and sales decline. FIG. 3 illustrates a sample product lifecycle, showing the number of consumers adopting the product, i.e., product adoption or product purchase, versus time. In this example, the purchasers of the product may be divided into four categories. First, there are the early adopters 310. These are people who embrace new products and technologies before most other people do. Early adopters tend to buy or try out new products sooner than their peers. Often, the first 10% to 15% of the people who buy a new product are considered early adopters for that product.

Next, there are the influencers 320. These people tend to buy a new product before the majority, and tend to have influence over other potential buyers. Often, the next 15% to 20% of the people who buy the new product after the early adopters 310 are considered influencers. Sometimes, among the influencers 320 is a subgroup of people who are brand advocates for a particular brand of product. Brand advocates tend to be loyal to a particular brand and buy many products from the same brand.

Next, there are the majority 330, the next 30% to 50% of the people who buy the product after the influencers 320. And finally, there are the late adopter or the laggards, the remaining group of people who buy the product after most other people. Of course, the percentages given above are merely guidelines and are not specific definitions for theses categories of users. There may be overlaps between multiple categories of users, such as overlap between early adopters and influencers or between influencers and majority purchasers.

FIG. 3 is only one example of categorizing purchasers with respect to a product's lifecycle. In another example, the purchasers may be divided in to innovators, early adopters, early majority, late majority, and laggards. Regardless of which system is used to categorizing the purchasers, in general, a purchaser may be considered to belong to one of these categories in a product's lifecycle based on the time at which the purchaser purchases, i.e., adopts, the product.

The categorization of the purchasers is product specific. A purchaser may be an early adopter with respect to one product or one category of products but a laggard with respect to another product or another category of products. Sometimes, people may never purchase a product at all. Otherwise, a person may purchase the same product multiple times at different points in time on the product's lifecycle.

By looking at consumers', i.e., users', social network data as well as historical product adoption data, users from a social network may be divided into the various categories on a product's lifecycle. Once it may be determined which user belongs to which category, appropriate advertisement may be selected for each category of users and sent to those users at the appropriate time to maximize the advertising effect. At the same time, the users may be encouraged to pass on the product information to their acquaintances.

Figure 4:
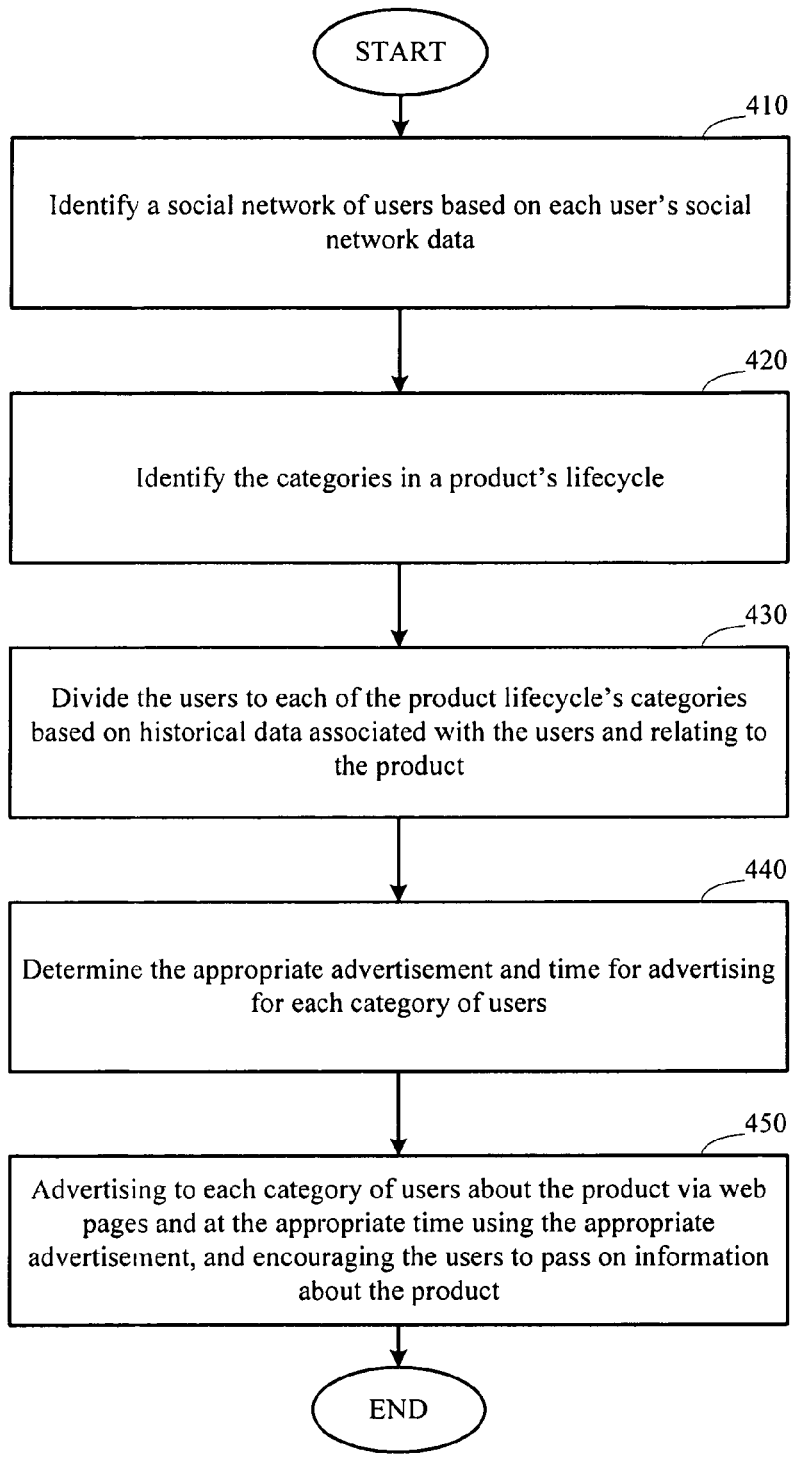
FIG. 4 illustrates a method of conducting online advertising with respect to a product.

FIG. 4 illustrates a method of conducting online advertising with respect to a product. This method is described in connection with the sample social network 200 shown in FIG. 2 and the sample product lifecycle shown in FIG. 3. At 410, a social network including many users may be identified based on individual users' social network data. As described above with reference to FIGS. 1 and 2, each user's social network data may be obtained from various online and/or offline sources, such as the contact list from the user's email account(s) or messaging account(s), the online chat or discussion groups and forums, websites, etc. Multiple users' social network data may be gathered together to construct a large social network, e.g., the social network 200, that includes the users and the methods by which they communicate with each other.

At 420, various categories in a product's lifecycle are identified. Again, different categories may be chosen for a particular product, depending on the marketing needs or requirements of the specific product, and the category names may vary. In general, the categories include users who adopt, i.e., purchase, the product relatively early and influence the others who adopt the product relatively late. As an example, the four categories, i.e., early adopters, influencers, majority, and laggards, shown in FIG. 3 may be used in connection with this description.

Steps 410 and 420 may be performed in any order or in parallel, since they do not depend on each other's results in any way.

At 430, the users in the social network are divided into the various categories for a product based on historical data associated with the users and relating to the product. Various characteristic and behavioral data associated with the users may be used to help determine to which category a particular user belongs. For example, historical product conversion data of similarly products may be used to determine whether a user tend to purchase this type of product relatively early or relatively late. Product conversion data may indicate, among other things, the time a user purchases a particular product. Product conversion data with respect to a product may readily be correlated with the particular stage in a product's lifecycle in which a user purchases the product. The data may be collected via various channels, such as from online user session data, web browser cookies, online and offline surveys, etc. Other product marketing and sales data, such as sales rate or revenue may also be used.

Suppose the product is a new brand and/or model of MP3 player, such as Apple's iPod nano, product conversion data relating to another MP3 player with similar features or functionalities, such as Creative's Zen V Plus, may be used. If a particular user in the network 200, e.g., the user 211, has bought a Creative Zen V Plus relatively early, i.e., shortly after the Creative Zen V Plus is introduced into the market and before other users in the network 200, it may be reasonably inferred that the user 211 may buy an Apple iPod nano relatively early as well. In this case, the user 211 may be considered an early adopter or an influencer with respect to the Creative Zen V Plus, depending on the specific time during the Creative Zen V Plus' lifecycle at which the user 211 purchased the product. And if the user 211 is an early adopter or influencer for the Creative Zen V Plus, it may be reasonable to assume that the user 211 will be an early adopter or influencer with respect to the similarly featured Apple iPod nano.

Conversely, if a user in the network 200, e.g., the user 221, bought a Creative Zen V Plus relatively late or has never bought one, the user 221 may be considered a laggard with respect to the Creative Zen V Plus. And it therefore may be reasonable to assume that the user 221 will be a laggard with respect to the Apple iPod nano as well.

Product conversion data is only one way to help categorize users with respect to a product, and such data alone may not provide an accurate picture. For example, if a user purchased a Creative Zen V Plus early, the same user may not want to purchase an Apple iPod nano at all, since the user already has an MP3 player. Therefore, other types of user data may be needed to help further refine the categorization.

One example is to use users' social network data. As may be seen in the network 200 in FIG. 2, users within a social network tend to cluster into groups. Toward the middle of the network 200 are users with many contacts, such as users 231, 232, or 233. On average, theses users in the middle of the network 200 tend to have over 30 contacts ties each. On the other hand, on the fringe of the network 200 are users with smaller numbers of contacts, such as users 211, 212, 221, or 222. On average, the users on the fringe of the network 200 tend to have about 15 contacts ties or fewer each.

By analyzing the behaviors of the users within a social network, it may be determined or inferred that users in the middle of the network tend to be influencers with respect to a product, whereas users on the fringe of the network tend to be either early adopters or laggards with respect to the product.

There are several ways to distinguish the users on the fringe of the social network in order to determine whether one is an early adopter or a laggard with respect to a product. First, historical purchase behavioral data about the user, such as product conversion data, may be used. As described above, a person who purchases a product relatively early tends to purchase another similar product relatively early, and vice versa. Moreover, the user's social behavioral pattern may also help distinguish an early adopter from a laggard. In general, an early adopter tends to send out communications to the other users more than receiving communications from the other users in the social network, such as users 211 and 212, whereas a laggard tend to receive communications from the other users more than sending out communications to the other users, such as users 221 and 222. At the same time, an early adopter often receives communications, and thus information, from outside the network, such as users 211 and 212. It is one way early adopters obtain information about new products.

Among those users near the middle of the social network who are influencers, there may be a subgroup of users who may be considered as brand advocates. Such users are loyal to a particular brand and tend to purchase many products from the same brand. For example, if a user tends to primarily purchase products made by Sony, such as buying a Sony digital camera, a Sony MP3 player, a Sony television, a Sony computer, etc., and tends to recommend Sony products to his or her acquaintances, then this user may be considered a brand advocate for Sony. By correlating a user's purchasing habit with the user's position and connections within the social network, it may be determined, whether the user is a brand advocate for a particular brand of products. Brand advocates may be very important and valuable to the company whose brand of products they advocate, even more so than influencers or early adopters.

Another example is to provide a score system for each individual user with respect to each product or each category of products in the network to help categorize the users. According to a specific embodiment, 6 scores may be assigned to each user with respect to each specific product or each specific category of product. These 6 scores are listed below in Table 1.

TABLE 1

A Sample Score System

| | |
|---|---|
| Score for propensity to engage | Confidence level for propensity-to-engage score |
| Score for propensity to adopt | Confidence level for propensity-to-adopt score |
| Score for propensity to influence others within the social network | Confidence level for propensity-to-influence score |

The propensity-to-engage score indicates a user's propensity to engage with the product, such as interacting with an online advertisement for the product, reading information about the product, etc. The propensity-to-adopt score indicates the likelihood that the user actually purchases the product. The propensity-to-influence-others score indicates the user's propensity to pass information about the product to the other users in the social network. The confidence level for each score indicates how confident the advertisers believe the scores accurately reflect the user's true behavior. Of course, other score systems may be used as well, depending on the implementations of the system.

These scores for the users may be determined based on historical data collected about the users, such as from the users' online activities. For example, when a user clicks on a link displayed on a web page about a product, the user's propensity-to-engage score for that product may be increased. Or, when the user purchases a product, the user's propensity-to-adopt score for that product may be increased. Similarly, when the user emails to a friend about a product, the user's propensity-to-influence-others score for that product may be increased.

The scores for each user with respect to each product or each category of products typically change with time. That is, for example, as new information about the user becomes available, his or her scores may be adjusted accordingly. And these scores may be used to determine whether a particular user is an early adopter, an influencer, a member of the majority, or a laggard with respect to a product.

Once the users of a social network have been properly categorized with respect to a product, at 440, appropriate advertising and the time for advertising are determined for each category of users based on the characteristics of the users in the category. For example, since early adopters are more interested in new products and new technologies, advertisement for this category of users may be tailored with an emphasis on the product's new features or functionalities. In addition, advertising to early adopters is preferably done early in the product's lifecycle, and perhaps even before the product is introduced to the market.

Influencers are those users who tend to pass product information along to the others. Thus, it may be more important to advertise to the influencer than any other categories of users, especially in a word-of-mouth marketing process. More effort may be spent in providing useful and comprehensive product information to the influencers so that these users may pass such information on to their friends and families. And the information is preferably sent to the influencers relatively early in the product's lifecycle. In this sense, influencers who have many contact ties and are willing to pass product information on to the others in the network may be more valuable to the advertisers than early adopters. Advertisement to the influencers may include incentives that help encourage influencers to pass on the information. For example, the influencers may receive some benefit, such as a bonus point or a price discount, each time he or she passes on the product information to a friend or acquaintance.

Laggards tend to wait for a long time before purchasing a product. For example, some may wish to wait until the price for product has decreased. Thus, as sales for a product declines, it may be a good time to advertise to the laggards to inform them about bargain deals, etc.

Finally, at 450, the appropriate advertisement for the product is sent to each category of users at the appropriate time during the product's lifecycle. For example, many websites dynamically generate web pages when they are requested by the users. The dynamically generated web pages include contents tailored to the particular users requesting them. Thus, when a user requests a web page, one or more suitable adverts for a product may be selected and included in the web page based on the category to which the user belongs. If the user is an early adopter with respect to digital cameras, the web page may include an ad for a brand new model of digital camera that just comes to the market or is about to be released to the market. Conversely, if the user is a laggard with respect to smart telephones, the web page may include an ad for a model of smart telephone that has reached its market maturity.

Furthermore, the same concept may be used to tailor other types of web page content, i.e., not just advertisement, for individual users. For example, if a user requests a web page relating to information on a particular product, depending on the user's category, different information and/or information with different emphases may be provided when dynamically generating the web page. If the user is an early adopter, then the information may have an emphasis on the new features of the product. If the user is a brand advocate, then the information may include some points on the overall benefits and/or advantages of the product brand.

Of course, web pages are not the only channel for delivering such content to the users. Other means may be employed as well. For example, the user-tailored content object(s) may be included in documents, e.g., word documents or PDF files, emails, short messages, etc. sent to the users. In fact, the content object(s) may be included in any form of user interface to be delivered to the users through any communication channels.

It may be illustrative to apply the method described in FIG. 4 to an example of a real-world scenario. Suppose a company wishes to conduct an ad campaign for its new model of MP3 player, and for this particular campaign, the company wishes to target consumers between the ages of 25 and 40 residing in the United States. Also suppose that the company has created various ads that target different categories of consumers.

First, a social network is determined that includes users between the ages of 25 and 40 residing in the United States. Based on the users' personal scores with respect to other brands and/or models of MP3 players, they may be divided into categories of early adopters, influencers, majority, and laggards. And the ads are sent to each category of users respectively at the appropriate times. In this sense, each user's score influences the ad(s) he or she will receive. For example, different ads may be delivered to different categories of users via dynamically generated web pages, or send to different categories of users at different times via emails, text messages, etc.

The social network data may help improve advertising of the product in other ways. For example, in addition to relying on the users to send information about the product to their acquaintances, the advertisers may send information about the product to a user's acquaintances based on the user's interactions with the product. Suppose a user has bought a particular model of MP3 player. The advertisers may then send messages to people within the user's social network, informing them that their friend, i.e., the user, has purchased the MP3 player and suggesting to them that they may want to purchase the same MP3 player as well.

Figure 5:
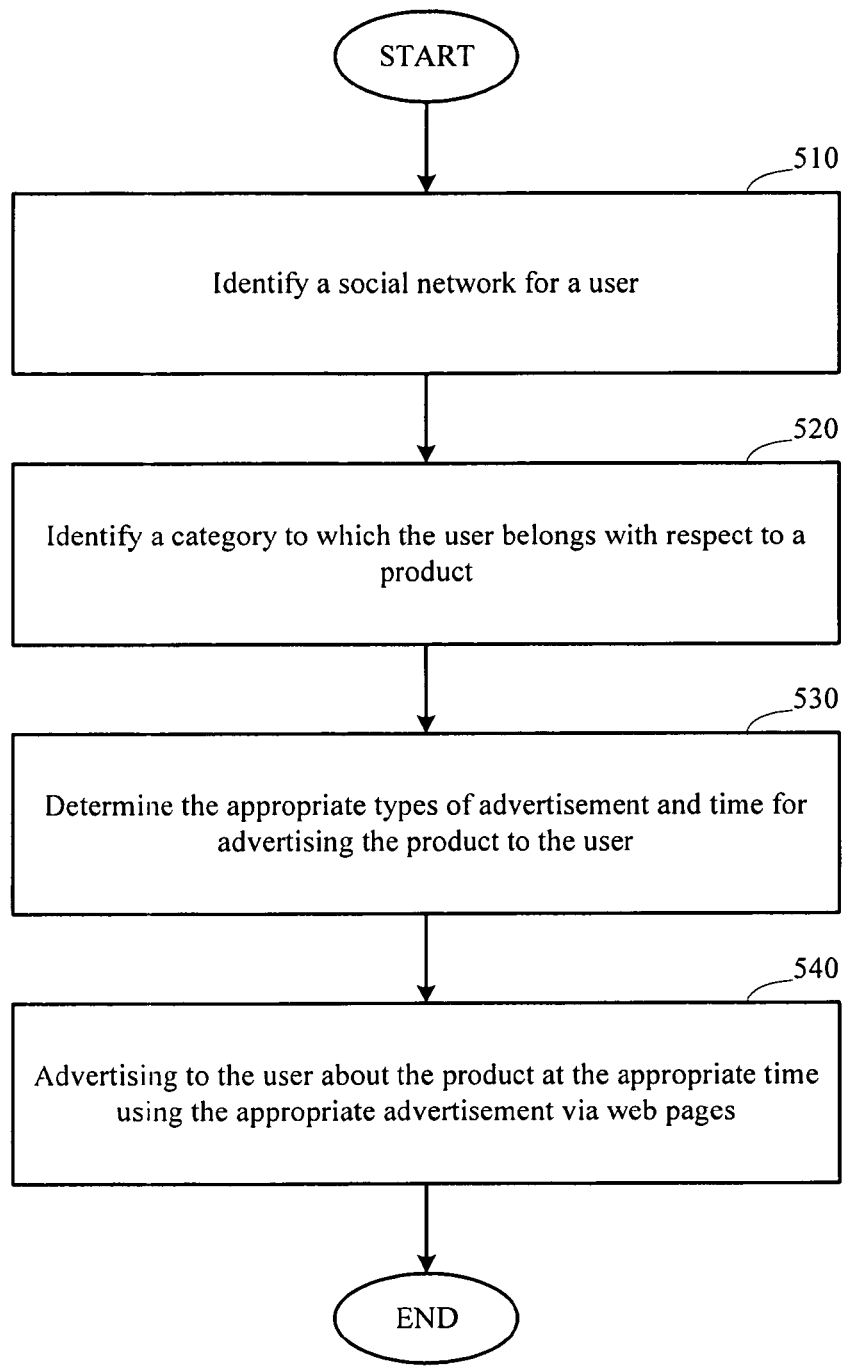
FIG. 5 illustrates a method of conducting online advertising from a user's perspective.

FIG. 5 illustrates a method of conducting online advertising from a single user's perspective. At 510, a social network is identified for the user based on the user's demographic and other personal information. As explained before, a social network may include only users satisfying certain criteria. Thus, the first step is to determine whether or not the user belongs to a particular social network. Next, at 520, the user is categorized with respect to a product. And based on the user's category and score, at 530, an appropriate advertisement for the product is determined for the user. Finally, at 540, the advertisement for the product is sent to the user through different channels, such as via dynamically generated web pages when requested by the users or direct communications sent to the user at the appropriate time.

Figure 6:
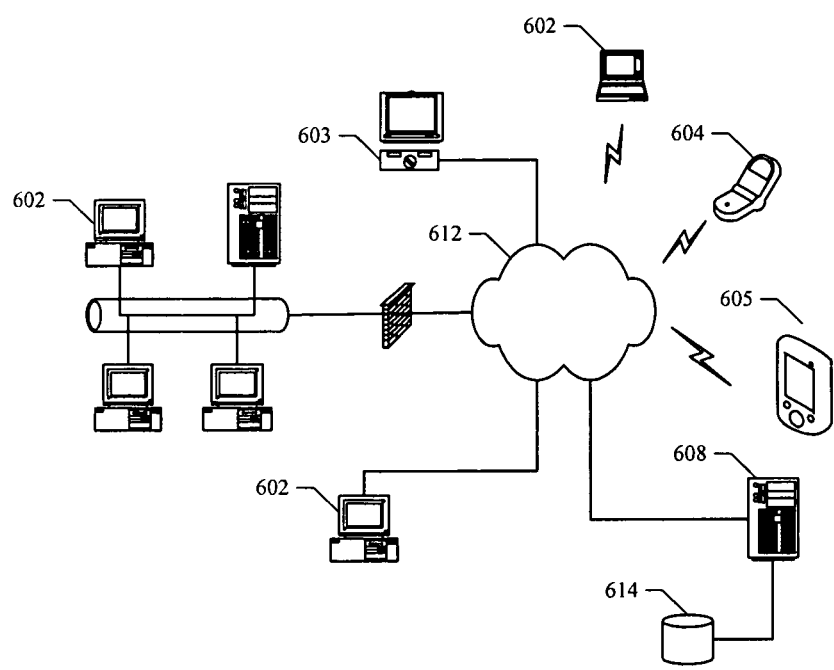
FIG. 6 is a simplified diagram of a network environment in which specific embodiments of the present invention may be implemented.

The methods shown in FIGS. 4 and 5 may be implemented as computer software programs in a wide variety of computing contexts. FIG. 6 is a simplified diagram of an example of a network environment in which specific embodiments of the present invention may be implemented. The various aspects of the invention may be practiced in a wide variety of network environments (represented by network 612) including, for example, TCP/IP-based networks, telecommunications networks, wireless networks, etc. In addition, the computer program instructions with which embodiments of the invention are implemented may be stored in any type of computer-readable media, and may be executed according to a variety of computing models including, for example, on a stand-alone computing device, or according to a distributed computing model in which various of the functionalities described herein may be effected or employed at different locations. All or a portion of the software program implementing various embodiments may be executed on the server 608. Similarly, a website may be hosted on the server 608 or by one of the computers 602, 603.

The user demographic information and other user activity data may be collected and stored in database(s) such as database 614. These data may be used to provide scores and confidence levels for each user with respect to each product or each category of products. Similarly, users' social network information may be collected and stored in database(s) such as database 614, and such information may help categorize the users.

While this invention has been described in terms of several preferred embodiments, there are alterations, permutations, and various substitute equivalents, which fall within the scope of this invention. It should also be noted that there are many alternative ways of implementing the methods and apparatuses of the present invention. It is therefore intended that the following appended claims be interpreted as including all such alterations, permutations, and various substitute equivalents as fall within the true spirit and scope of the present invention.

What is claimed is:

1. A computer-implemented method of online advertising, comprising:
   receiving a request for an interface from a user;
   electronically determining by a computing device at least one category to which the user belongs with respect to a social network to which the user belongs and with respect to a particular type of product, wherein each category indicates a position of the user in the social network with respect to a product lifecycle, wherein determining is performed, at least in part, based upon activities of the user in connection with the particular type of product, wherein the activities of the user in connection with the particular type of product indicate a time in the product lifecycle at which the user adopts the particular type of product;
   electronically determining by the computing device at least one content object to be displayed on the interface based on the at least one category to which the user belongs; and
   delivering the at least one content object to the user via the interface.

2. The computer-implemented method, as recited in claim 1, further comprising:
   categorizing the user into one of a plurality of categories with respect to the social network and with respect to the particular type of product, wherein each of the plurality of categories corresponds to a different one of a plurality of periods in the product lifecycle.

3. The computer-implemented method, as recited in claim 2, wherein categorizing the user into one of the plurality of categories comprises:
   comparing the activities of the user in connection with the particular type of product with activities of other users belonging to the social network in connection with the particular type of product.

4. The computer-implemented method, as recited in claim 1, further comprising:
   categorizing a plurality of users belonging to the social network into a plurality of categories respectively with respect to the particular type of product, wherein the user is one of the plurality of users, wherein each of the plurality of categories corresponds to a different one of a plurality of periods in the product lifecycle.

5. The computer-implemented method, as recited in claim 4, wherein categorizing the plurality of users is based on historical product data associated with the particular type of product, social network data of each of the plurality of users, and the indication of the time in the product lifecycle at which the user adopts the particular type of product.

6. The computer-implemented method, as recited in claim 4, wherein categorizing the plurality of users is based on a score system, such that each of the plurality of users has a score with respect to the particular type of product that is determined based on the user's historical activity data relating to the particular type of product, the user's historical activity data relating to the type of product including the time in the product lifecycle at which the user adopts the particular type of product.

7. The computer-implemented method, as recited in claim 4, further comprising:
   constructing the social network using social network data from each of the plurality of users.

8. The computer-implemented method, as recited in claim 7, wherein constructing the social network further uses at least one selected from the group consisting of demographic data, behavior data, and user intent data from each of the plurality of users.

9. The computer-implemented method, as recited in claim 4, wherein the plurality of categories are selected from the group consisting of innovators, early adopters, influencers, brand advocators, majority, early majority, late majority, late adopters, and laggards.

10. The computer-implemented method, as recited in claim 4, further comprising:
    determining at least one content object for each of the plurality of categories of users with respect to the particular type of product.

11. The computer-implemented method as recited in claim 1, wherein the at least one content object includes an advertisement or information pertaining to a product of the particular type of product.

12. The computer-implemented method as recited in claim 1, further comprising:
    determining a time to deliver the at least one content object in relation to the product lifecycle based upon the at least one category;
    wherein delivering the at least one content object to the user is performed in relation to the product lifecycle according to the determined time to deliver.

13. The computer-implemented method as recited in claim 1, wherein the at least one category includes early adopter, wherein the at least one content object is delivered early in the product lifecycle or before a product is introduced.

14. The computer-implemented method as recited in claim 1, wherein the at least one category includes laggard, wherein the at least one content object is delivered late in the product lifecycle.

15. The computer-implemented method as recited in claim 1, further comprising:
tailoring content of the at least one content object in accordance with the at least one category.

16. The computer-implemented method, as recited in claim 1, further comprising:
categorizing the user into one of a plurality of categories with respect to the particular type of product based, at least in part, upon communication patterns of the user with respect to other users in the social network.

17. A system for online advertising, comprising at least one computing device configured to:
determine at least one category to which a user belongs with respect to a social network to which the user belongs and with respect to a particular type of product, wherein each category indicates a position of the user in the social network with respect to a product lifecycle, wherein determining is performed, at least in part, based upon activities of the user in connection with the particular type of product, wherein the activities of the user in connection with the particular type of product indicate a time in the product lifecycle at which the user adopts the particular type of product;
determine at least one content object to be delivered to the user based on the at least one category to which the user belongs; and
deliver the at least one content object to the user.

18. The system, as recited in claim 17, wherein the at least one computer device is further configured to:
categorize the user into one of a plurality of categories with respect to the social network and with respect to the particular type of product, wherein each of the plurality of categories corresponds to a different one of a plurality of periods in the product lifecycle.

19. The system, as recited in claim 17, wherein the at least one computer device is further configured to:
categorize a plurality of users belonging to the social network into a plurality of categories respectively with respect to the type of product and the product lifecycle, wherein the user is one of the plurality of users, wherein each of the plurality of categories corresponds to a different one of a plurality of periods in the product lifecycle.

20. The system, as recited in claim 19, wherein categorizing the plurality of users is based on historical product data associated with the particular type of product, user event data, and social network data of each of the plurality of users.

21. The system, as recited in claim 19, wherein categorizing the plurality of users is based on a score system, such that each of the plurality of users has a score with respect to the particular type of product that is determined based on the user's historical activity data relating to the particular type of product.

22. A computer program product for online advertising comprising a computer-readable medium having a plurality of computer program instructions stored therein, which are operable to cause at least one computing device to:
determine at least one category to which a user belongs in relation to other users in a social network to which the user belongs and with respect to a particular type of product, wherein each category indicates a position of the user in the social network with respect to a product lifecycle, wherein determining is performed, at least in part, based upon activities of the user in connection with the particular type of product, wherein the activities of the user in connection with the particular type of product indicate a time in the product lifecycle at which the user adopts the particular type of product;
determine at least one content object to be delivered to the user based on the at least one category to which the user belongs; and
deliver the at least one content object to the user.

23. The computer program product, as recited in claim 22, wherein the plurality of computer program instructions are further operable to cause the at least one computing device to:
categorize the user into one of a plurality of categories with respect to the social network and with respect to the particular type of product, wherein each of the plurality of categories corresponds to a different one of a plurality of periods in the product lifecycle.

24. The computer program product, as recited in claim 22, wherein the plurality of computer program instructions are further operable to cause the at least one computing device to:
categorize a plurality of users belonging to the social network into a plurality of categories respectively with respect to the particular type of product and the lifecycle of the product, wherein the user is one of the plurality of users, wherein each of the plurality of categories corresponds to a different one of a plurality of periods in the product lifecycle.

25. The computer program product, as recited in claim 24, wherein categorizing the plurality of users is based on historical product data associated with the particular type of product, user event data, and social network data of each of the plurality of users.

26. The computer program product, as recited in claim 24, wherein the plurality of users are categorized based on a score system, such that each of the plurality of users has a score with respect to the particular type of product that is determined based on the user's historical activity data relating to the particular type of product.

* * * * *